L. D. RYAN.
FRICTION TRANSMISSION MECHANISM.
APPLICATION FILED NOV. 20, 1912.

1,076,155. Patented Oct. 21, 1913.

Witnesses
M. S. Watson
Francis Boyle

Inventor
L D Ryan
By Chandler & Chandler
Attorneys

UNITED STATES PATENT OFFICE.

L D RYAN, OF CORTLAND, NEW YORK.

FRICTION TRANSMISSION MECHANISM.

1,076,155.  Specification of Letters Patent.  Patented Oct. 21, 1913.

Application filed November 20, 1912. Serial No. 732,522.

*To all whom it may concern:*

Be it known that I, L D RYAN, a citizen of the United States, residing at Cortland, in the county of Cortland, State of New York, have invented certain new and useful Improvements in Friction Transmission Mechanism; and I do hereby declare the following to be a full, clear, and exact description of the invention, such as will enable others skilled in the art to which it appertains to make and use the same.

This invention relates to friction transmission mechanism and has for an object to provide means whereby the speed of the driven parts may be gradually increased or diminished by shifting a single central power transmission disk wheel.

A further object of the invention is to provide means for insuring a good frictional engagement between the driving parts and the power transmission disk wheel, and between the driven parts and the power transmission disk wheel.

With the above objects in view the invention consists of certain novel details of construction and combination of parts hereinafter fully described and claimed, it being understood that various modifications may be made in the minor details of construction within the scope of the appended claims.

Figure 1:
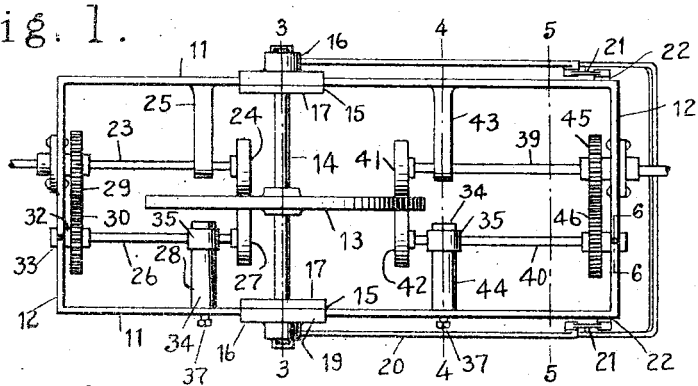
Figure 2:
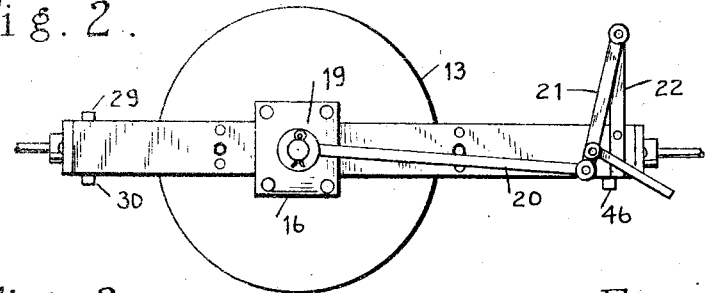
Figure 3:
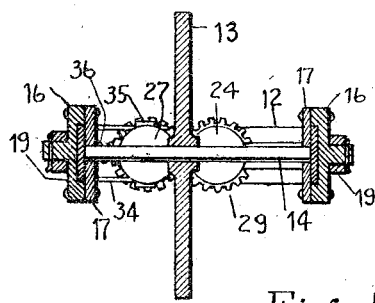
Figure 4:
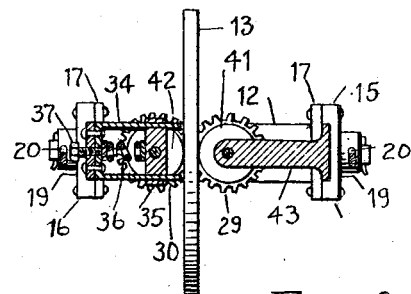
Figure 5:
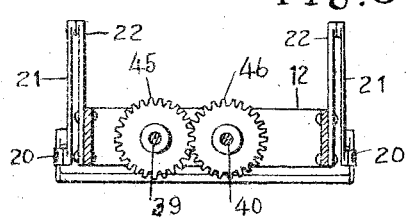
Figure 6:
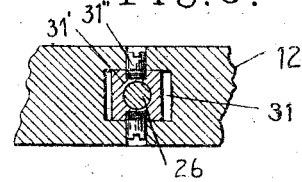

In the accompanying drawing forming part of this specification:—Figure 1 is a plan view of my invention. Fig. 2 is a side elevation. Fig. 3 is a cross section taken on the line 3—3 Fig. 1. Fig. 4 is a cross sectional view taken on the line 4—4 Fig. 1. Fig. 5 is a cross sectional view taken on the line 5—5 Fig. 1. Fig. 6 is a cross sectional view on the line 6—6 Fig. 1.

Referring now to the drawing in which like characters of reference designate similar parts, 10 designates a substantially rectangular frame including opposite sides 11 connected by ends 12. A disk wheel 13 is revolubly mounted on a shaft 14 the ends of which are fitted in bearings 15 which are slidably fitted on the sides 11. Each bearing comprises a substantially U-shaped plate 16 which straddles the outer face and top and bottom edges of the related side, and a cap plate 17 which is bolted to the legs of the plate 16 and is disposed on the inner face of the related side, the cap plate being provided with a central opening 18 to receive the shaft 14. Each U-shaped plate 16 is provided with a centrally disposed lug 19 to which is secured a connecting rod 20, the latter being connected to a rock link 21 that is pivoted at the upper end to the upper end of a standard 22 carried upon the related side. Both rock links may be connected in any suitable manner to an operating lever and serve when actuated to slide the disk wheel 13 longitudinally of the frame 10. The disk wheel is free to move longitudinally of its supporting shaft 14, this movement of the wheel being utilized in attaining a good frictional contact of the driving and driven parts with the wheel as will presently appear.

Rotary movement is imparted to the disk wheel by means of a power shaft 23 which is journaled for rotation in one of the frame ends 12 and is terminally equipped with a friction disk 24 that bears upon one face of the disk wheel 13. The power shaft is supported near its friction disk by means of a stationary bearing 25 carried by the adjacent side of the frame. To impart power uniformly to both sides of the disk wheel, a stub shaft 26 is pivotally journaled in the same end of the frame as the power shaft, and is terminally equipped with a friction disk 27 which engages the opposite side of the disk wheel from the power shaft friction disk. The stub shaft is supported near its friction disk by means of a tension bearing 28 which exerts a pressure on the stub shaft and causes the stub shaft friction disk to urge the disk wheel 13 longitudinally of its shaft 14 and into tight frictional engagement with the power shaft friction disk 24, which latter as above stated is supported in permanent position by the stationary bearing 25. Rotary movement is imparted to the stub shaft by means of intermeshing gears 29 and 30 carried by the power shaft and stub shaft respectively. To pivotally secure the stub shaft, a slot 31 is formed in the corresponding end of the frame, there being a bearing 31' pivoted in the slot by means of lugs 31", this bearing revolubly receiving the shaft, there being collars 32 and 33 secured to the shaft and adapted to contact with the inner and outer faces of the bearing to prevent escape of the stub shaft. The preferred form of tension bearing for the stub shaft comprises a U-shaped arm 34 the cross member of which is secured to the related side of the frame. A block 35 is provided near the ends with openings which loosely receive the legs of the arm 34 and is provided with a central opening to receive the stub shaft. A helical spring 36 is confined under tension between this block and the cross member of the U-shaped arm, the pressure of the spring being regulated by a set screw 37 which is threaded through the side of the frame and is terminally equipped with a flange 38 that bears against the outer end of the spring 36.

Lying within the same plane occupied by the power shaft and stub shaft are driven shafts 39 and 40 which are counterparts in construction and mounting, of said power shaft and stub shaft but their friction disks 41 and 42 engage with the disk wheel 13 on the opposite side of the shaft thereof from the power shaft and stub shaft friction disk so that the driven shafts are rotated oppositely from the power shaft and stub shaft. The driven shaft 39 is journaled in the adjacent end 12 of the frame and is supported near its friction disk by means of a stationary bearing 43. The driven stub shaft 40 is pivotally journaled in the adjacent end of the frame, and is supported near its friction disk by means of a tension bearing 44, intermeshing pinions 45 and 46 connecting both of the driven shafts 39 and 40 together for simultaneous rotation.

When the disk wheel 13 is moved longitudinally of the frame toward the driven shafts, the friction disks of the latter will engage with the disk wheel nearer to the center thereof than the friction disks of the power shafts, as shown in dotted lines in Fig. 1, with a resultant increase in speed of the driven shafts. When the disk wheel is moved toward the driving shafts, the friction disks of the latter will engage with the disk wheel nearer to the center thereof than the friction disks of the driven shaft, with a resultant decrease in speed of the driven shafts. It is obvious that by properly shifting the disk wheel in either direction, any desired ratio of speed may be obtained between the driving and driven shafts. Furthermore, by virtue of the disk wheel being slidably mounted on its supporting shaft, and by virtue of the spring pressed driving and driven stub shafts constantly exerting a pressure through the instrumentality of their friction disks against the disk wheel to urge the latter into tight engagement with the friction disks of the rigidly held driving and driven shafts, a good frictional engagement between the disk wheel and both the driving and driven parts is assured at all times, and wear upon the parts will be automatically taken up, so that the long life and durability of the friction transmission is greatly promoted.

What is claimed, is:—

1. In a device of the kind described, a frame, spaced bearings movable longitudinally of said frame, a shaft journaled in said bearings, a power transmission disk wheel splined upon said shaft, a pair of power shafts arranged on opposite sides of said disk wheel, a friction disk carried by each shaft engaging the adjacent side of said wheel, a pair of driven shafts arranged in the plane of said power shafts and disposed on opposite sides of said wheel, a friction disk on each driven shaft engaging the adjacent side of said wheel, means for shifting said transmission wheel longitudinally between said driving and said driven shafts, movable bearings supporting certain of the friction disks, and an adjusting device resiliently connected to said bearings.

2. In a power transmission device, a laterally shiftable power transmission disk wheel, a pair of power shafts arranged on opposite sides of said disk wheel and each having a friction disk connection with the adjacent side of said disk wheel, and a pressure device operatively connected to one of said shafts and constantly exerting a pressure through the instrumentality of the shaft friction disk against said disk wheel with a resultant urging of the disk wheel laterally into tight frictional engagement with the friction disk of the other shaft.

In testimony whereof, I affix my signature, in the presence of two witnesses.

L D RYAN.

Witnesses:
   Florence A. Caine,
   Charlie Allen.